United States Patent
Hartzler

(10) Patent No.: US 11,242,151 B2
(45) Date of Patent: Feb. 8, 2022

(54) METHOD OF USING PRINTED HIGHLY FLEXIBLE CONDUCTIVE INK BUS BARS TO TRANSFER POWER TO HEATED COMPONENTS

(71) Applicant: Goodrich Corporation, Charlotte, NC (US)

(72) Inventor: Brad Hartzler, Doylestown, OH (US)

(73) Assignee: Goodrich Corporation, Charlotte, NC (US)

( * ) Notice: Subject to any disclaimer, the term of this patent is extended or adjusted under 35 U.S.C. 154(b) by 601 days.

(21) Appl. No.: 16/161,709

(22) Filed: Oct. 16, 2018

(65) Prior Publication Data

US 2020/0115060 A1  Apr. 16, 2020

(51) Int. Cl.
*B64D 15/12* (2006.01)
*H05B 3/34* (2006.01)
*B64D 33/02* (2006.01)

(52) U.S. Cl.
CPC ............... *B64D 15/12* (2013.01); *H05B 3/34* (2013.01); *B64D 2033/0233* (2013.01); *H05B 2214/02* (2013.01)

(58) Field of Classification Search
CPC .. B64D 15/12; B64D 2033/0233; H05B 3/34; H05B 2214/02
See application file for complete search history.

(56) References Cited

U.S. PATENT DOCUMENTS

| | | | | |
|---|---|---|---|---|
| 5,565,124 A | * | 10/1996 | Balzano | A43B 7/025 219/528 |
| 7,789,620 B2 | * | 9/2010 | Vontell, Sr. | F01D 5/18 415/178 |
| 7,950,863 B2 | * | 5/2011 | Bouix | A45D 40/267 401/129 |
| 9,133,714 B2 | * | 9/2015 | Vontell | F01D 5/18 |
| 9,296,487 B2 | * | 3/2016 | Larson, Jr. | B64D 41/007 |
| 9,635,713 B2 | * | 4/2017 | Groves | F26B 9/003 |
| 9,839,073 B2 | * | 12/2017 | Kessler | B64D 15/20 |

(Continued)

FOREIGN PATENT DOCUMENTS

| | | |
|---|---|---|
| EP | 2654373 | 10/2013 |
| EP | 2884818 A2 | 6/2015 |

(Continued)

OTHER PUBLICATIONS

Extended European Search Report dated Mar. 11, 2020, issued during the prosecution of European Patent Application No. EP 19203667.

*Primary Examiner* — Justin M Benedik
(74) *Attorney, Agent, or Firm* — Locke Lord LLP; Scott D. Wofsy; Joshua L. Jones

(57) ABSTRACT

A resistive heating circuit for a heated or ice protected aircraft structure includes a flexible dielectric substrate, a resistive heating element supported by the substrate, and a bus bar. The bus bar is electrically connected to the resistive heating element and includes a conductive ink printed onto the substrate such that the bus bar and resistive heating element flex freely with the heated or ice protected aircraft structure. Heated or ice protected aircraft structures and methods of making resistive heating circuits for heated or ice protected aircraft structures are also described.

15 Claims, 3 Drawing Sheets

(56) References Cited

U.S. PATENT DOCUMENTS

| | | | | |
|---|---|---|---|---|
| 2010/0270279 A1* | 10/2010 | Kapp | .................... | H05B 3/34 |
| | | | | 219/202 |
| 2016/0021704 A1* | 1/2016 | Elverud | ................ | H01B 1/24 |
| | | | | 219/549 |
| 2018/0235031 A1* | 8/2018 | Zhu | ..................... | H05B 3/34 |

FOREIGN PATENT DOCUMENTS

| EP | 3339178 | 6/2018 |
|---|---|---|
| WO | 2006/085054 | 8/2006 |

* cited by examiner

METHOD OF USING PRINTED HIGHLY FLEXIBLE CONDUCTIVE INK BUS BARS TO TRANSFER POWER TO HEATED COMPONENTS

BACKGROUND OF THE INVENTION

1. Field of the Invention

The present disclosure relates to resistive heating circuits, and more particularly to resistive heating circuits having flexible bus bars for heated or ice protected aircraft structures.

2. Description of Related Art

Restive heating elements, such as in aircraft, are commonly used to generate heat for comfort and for ice protection. Since the structures to which such resistive heating elements are attached can be subject to flexure the resistive heating element is generally constructed to accommodate the flexure of the structure. In applications where the underlying structure is potentially subject to high fatigue the resistive heating element can itself be relatively flexible. This allows the heating element to reliably generate heat notwithstanding the cyclic flexure.

One challenge to such flexible resistive heating elements is routing and attaching the power required for heating to the resistive heating element. The power is generally provided using cabling, wiring, and/or metallic plates which connect to the resistive heating element. While generally acceptable for its intended purpose, the cyclic flexure that the cabling, wiring, and/or metallic plates can themselves be subject to flexure and/or high fatigue sufficient to limit the ability to provide power to the resistive heating element. Cabling, wiring, and/or metallic plates also add weight to the structure being heated or requiring ice protection.

Such conventional methods and systems have generally been considered satisfactory for their intended purpose. However, there is still a need in the art for systems and methods that allow for improved bus bars for resistive heaters for high fatigue applications. The present disclosure provides a solution for these problems.

SUMMARY OF THE INVENTION

A resistive heating circuit for a heated or ice protected aircraft structure includes a flexible dielectric substrate, a resistive heating element supported by the substrate, and a bus bar. The bus bar is electrically connected to the resistive heating element and includes a conductive ink printed onto the substrate such that the bus bar and resistive heating element flex freely with the heated or ice protected aircraft structure.

In certain embodiments the dielectric substrate can be a heated aircraft component or an ice protected aircraft structure. The resistive heating element can be conformally disposed onto the substrate. The resistive heating element can include carbon nanotubes. The resistive heating element can include an etched metal pattern. The resistive heating element can include a wire mesh pattern.

In accordance with certain embodiments, the conductive ink can include silver particles in an epoxy resin. The bus bar can be conformally disposed onto the substrate. A portion of the bus bar can overlay the resistive heating element. The overlaying portion of the bus bar can be conformally disposed onto the resistive heating element.

It is contemplated that a conductive resin body can electrically connect the bus bar to the resistive heating element. The conductive resin can be conformally disposed on the resistive heating element. The overlaying portion of the bus bar can be conformally disposed onto the conductive resin body. It is also contemplated that a heated or ice protected aircraft structure can have a resistive heating circuit as described above, the resistive heating circuit supported by heated or ice protected aircraft structure.

A method of making a resistive heating circuit for a heated or ice protected aircraft structure includes supporting a resistive heating element with a flexible dielectric substrate. A bus bar is printed on the substrate using a conductive ink. The bus bar is electrically connected to the resistive heating element and flexibility of the resistance heating element matched or exceeded by flexibility of the bus bar such that resistive heating circuit flexes freely with the heated or ice protected aircraft structure.

In certain embodiments, supporting the resistive heating element can include conformally disposing the resistive heating circuit onto the substrate. The resistive heating circuit can include carbon nanotubes. The conductive ink can include silver particles in an epoxy resin.

In accordance with certain embodiments, printing the bus bar can include conformally disposing the bus bar onto the substrate. A portion of the bus bar can overlay the resistive heating element. The overlaying portion of the bus bar can overlay the resistive heating elements and be conformally disposed onto the resistive heating element.

It is also contemplated that, in accordance with certain embodiments, a conductive resin body can be disposed on the resistive heating element. The bus can be electrically connected to the resistive heating element with the conductive resin body. The conductive resin is conformally disposed on the resistive heating element. The overlaying portion of the bus bar can be conformally disposed onto the conductive resin body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
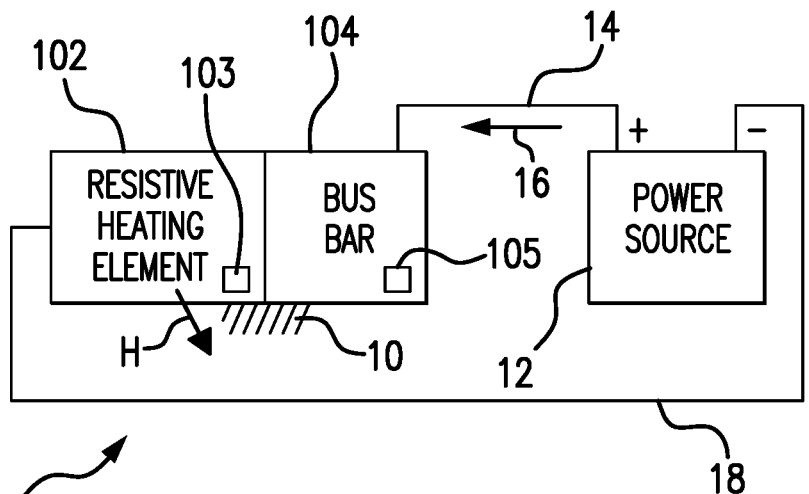
FIG. 1 is a schematic view of heated or ice protected aircraft structure with a resistive heating circuit constructed in accordance with the present disclosure, showing the resistive heating circuit heating the aircraft structure.

Reference will now be made to the drawings wherein like reference numerals identify similar structural features or aspects of the subject disclosure. For purposes of explanation and illustration, and not limitation, an exemplary embodiment of a resistive heating circuit for a heated or an ice protected aircraft structure constructed in accordance with the disclosure is shown schematically in FIG. 1 and is designated generally by reference character 100. Other embodiments of resistive heating circuits, heated or ice protected aircraft structures, and methods of making resistive heating circuits for heated or ice protected structures in accordance with the disclosure, or aspects thereof, are provided schematically in FIGS. 2-6, as will be described. The systems and methods described herein can be used in heated or ice protected structures subject to flexure and/or high fatigue, such as floor panels and rotor blades, though the present disclosure is not limited to structures subject to flexure and/or high fatigue or to aircraft in general.

Referring to FIG. 1, resistive heating circuit 100 is shown. Resistive heating circuit 100 is fixed to a heated or ice protected aircraft structure 10 and includes a resistive heating element 102, a bus bar 104, and a power source 12. A positive terminal of power source 12 is electrically connected to bus bar 104 by a source lead 14 to provide a flow of electric current 16 to resistive heating element 102. Bus bar 104 is electrically connected to resistive heating element 102 to provide flow of electric current 16 to resistively generate heat H. Resistive heating element 102 is in thermally communication with heated or ice protected aircraft structure 10 to communicate heat thereto. Resistive heating element 102 is electrically connected to a negative terminal of power source 12, such as by a return lead 18 and/or a chassis ground, as suitable for an intended application. Heated or ice protected aircraft structure 10 can be a floor panel for an aircraft interior, an engine inlet cowling, or a blade for a rotorcraft by way of non-limiting example.

As will be appreciated by those of skill in the art in view of the present disclosure, vehicles like aircraft typically encounter different environments during flight. Some of these environments include rain, ice, and/or extreme cold. To reliability operate in such environments its can be necessary to provide specialty heated components and/or electro thermal ice protection systems. In some applications the specialty heated components and/or electro thermal ice protection system requires transferring power to areas of the aircraft subject to flexure, which can be high fatigue areas for certain types of materials and structures.

To accommodate flexure of the heated or ice protected structure resistive heating elements formed from carbon nanotubes (CNT) can be applied to high fatigue areas. CNT resistive heating elements have the advantage of robustness, and generally are able to withstand the cyclic flexure commonly experienced in high fatigue areas. However, there remains the challenge of providing the power to such resistive heating elements without adding significant weight and/or losing the beneficial robustness provided by the CNT resistive heating element itself which can be the case with wiring or long strips of foil bus bars are used to provide electrical communication with the CNT resistive heating element. To solve this problem resistive heating circuit 100 bus bar 104 is printed to provide flexibility 105 corresponding (e.g., the flexibility of bus bar 104 matching or exceeding) to flexibility 103 of resistive heating element 102. In certain embodiments return lead 18 can include also be printed to provide flexibility 107 corresponding to flexibility 103 of resistive heating element 102.

Figure 2:
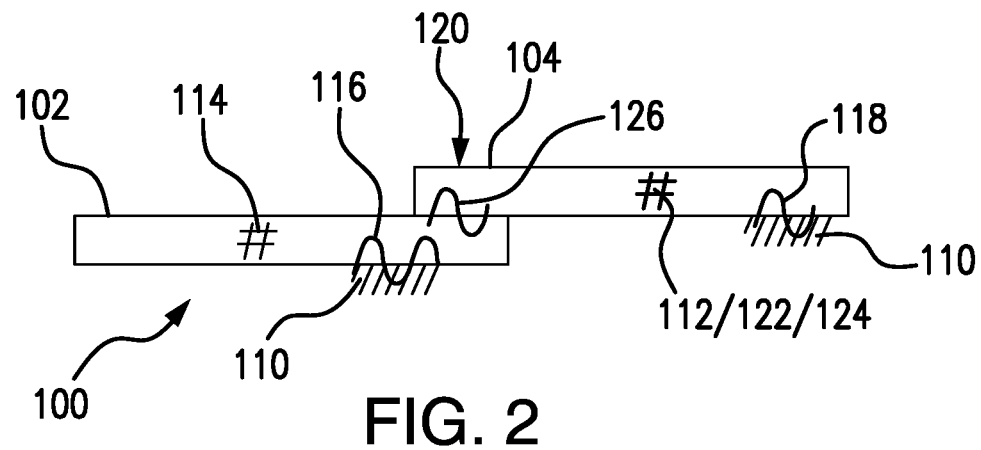
FIG. 2 is a side elevation of the resistive heating circuit of FIG. 1, showing a flexible bus bar electrically connected to a resistive heating element with a portion of the bus bar conformally disposed onto the resistive heating circuit.

With reference to FIG. 2, resistive heating circuit 100 is shown. Resistive heating circuit 100 includes a flexible dielectric substrate 110 (which may be aircraft structure 10), resistive heating element 102 supported by substrate 110, and bus bar 104. Bus bar 104 is electrically connected to resistive heating element 102 and includes a conductive ink 112 printed onto substrate 110 such that bus bar 104 and resistive heating element 102 flexes freely with the heated or ice protected aircraft structure 10 (shown in FIG. 1).

Resistive heating element 102 includes a CNT body 114. CNT body 114 is configured and adapted to resistively heat aircraft structure 10 using electric current 16 (shown in FIG. 1) provided to resistive heating element 102. It contemplated that resistive heating element 102 (and/or CNT body 114) can be conformally disposed 116 onto substrate 110, resistive heating element 102 thereby flexing in concert with substrate 110. In certain embodiments substantially the entirety of resistive heating element 102 is formed from CNT body 114.

Bus bar 104 includes conductive ink 112 and is printed onto substrate 110. Printing conductive ink 112 enables bus bar 104 to be conformally disposed 118 onto substrate 110. It is contemplated that a portion 120 of bus bar 104 can overlay a portion of resistive heating element 102. Overlaying portion 120 of bus bar 104 can be conformally disposed 126 onto resistive heating element 102. In certain embodiments conductive ink 112 includes silver particles 122 in an epoxy resin 124. Examples of suitable conductive inks include silver-vinyl inks available from engineered materials systems, inc. Of delaware, ohio.

Figure 3:
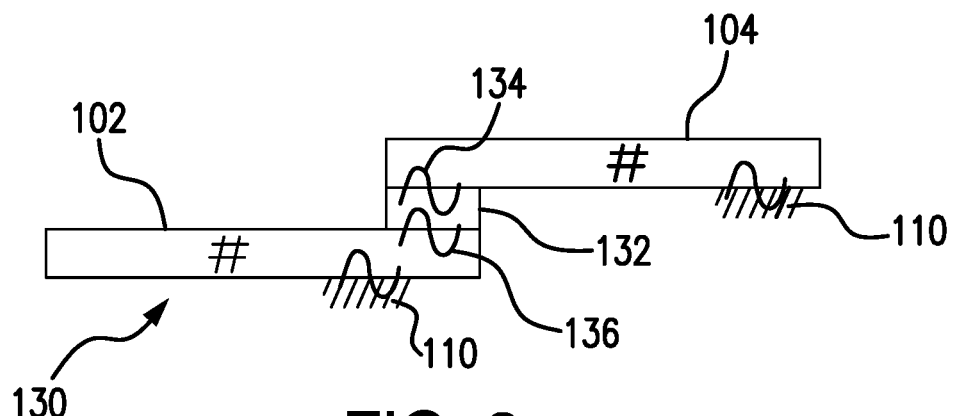
FIG. 3 is a side elevation of the resistive heating circuit of FIG. 1 with a conductive resin body, showing a flexible bus bar electrically connected to a resistive heating element with a portion of the bus bar conformally disposed onto the conductive resin body.

With reference to FIG. 3, resistive heating circuit 130 is shown. Resistive heating circuit 130 is similar to resistive heating circuit 100 (shown in FIG. 1) and additionally includes an electrically conductive resin body 132. Resin body 132 overlays a portion of resistive heating element 102 and provides electrical communication between bus bar 104 and resistive heating element 102. In this respect portion 120 of bus bar 104 overlays resin body 132 and resistive heating element 102 such that electric current 16 (shown in FIG. 1) is communicated from bus bar 104 to resistive heating element 102 through resin body 132. It is contemplated that bus bar 104 can be conformally disposed 134 onto resin body 132. It also contemplated that resin body 132 can be disposed on (or conformally disposed 136 onto) resistive heating element 102. Examples of suitable conductive inks include silver-epoxy electrically conductive resins available from Engineered Materials Systems, Inc. of Delaware, Ohio.

Figure 4:
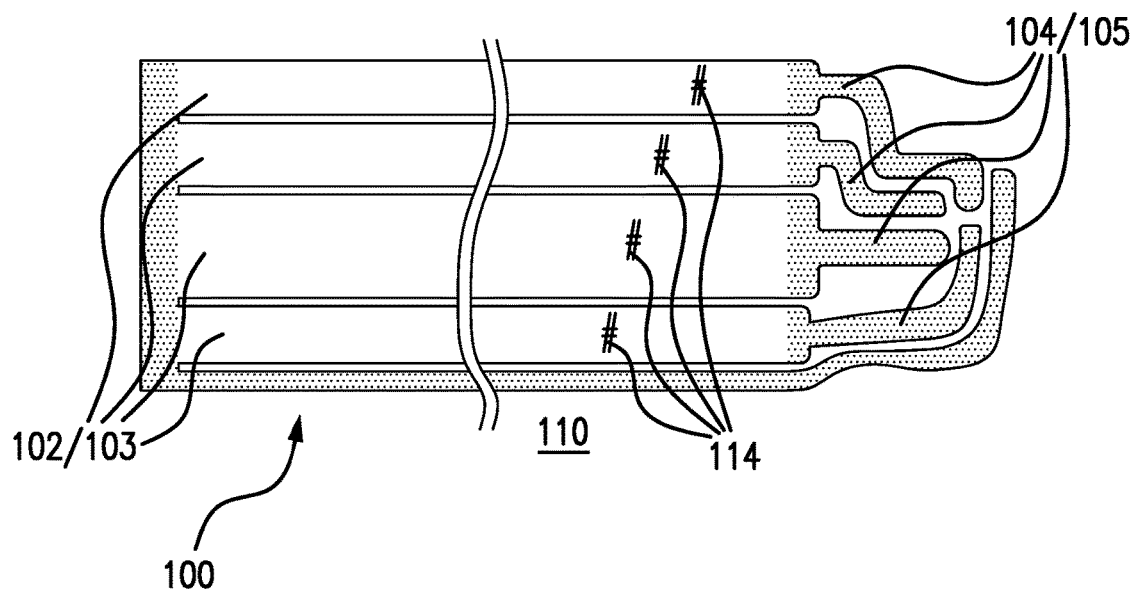
FIG. 4 is a plan view of the resistive heating circuit of FIG. 1, showing the flexible bus bar electrically connected to the resistive heating element having a carbon nanotube body.
Figure 5:
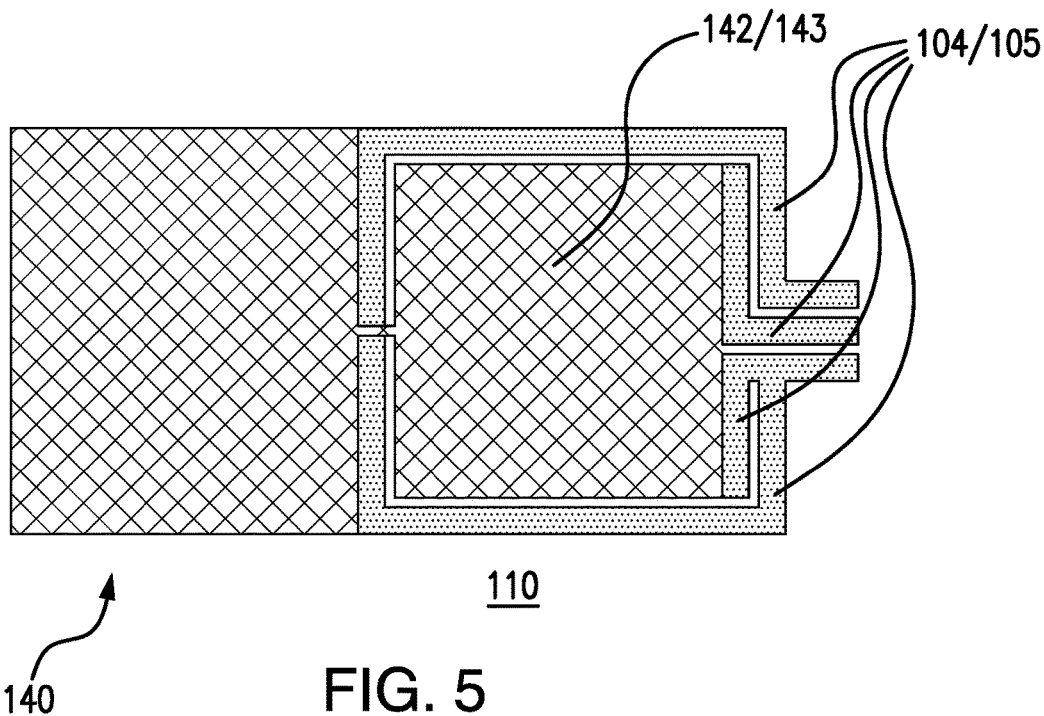
FIG. 5 is a plan view of the resistive heating circuit of FIG. 1, showing the flexible bus bar electrically connected to the resistive heating element having an etched or wire mesh body.

Referring to FIGS. 4 and 5, resistive heating circuit 100 is shown in a plan view. As shown in FIG. 4 resistive heating element 102 includes CNT body 114 and has flexibility 103. It is contemplated that flexibility 105 of bus bar 104 be equivalent to or greater than flexibility 103 of CNT body 114. As will be appreciated by those of skill in the art in view of the present disclosure, matching (or exceeding) flexibility 103 of CNT body 114 with flexibility 105 of bus bar 104 allows communication of electric current 16 (shown in FIG. 1) through resistive heating circuit 100 across structures subject to cyclic flexure and/or high fatigue with robustness, ensuring reliable heating or ice protection of substrate 110 notwithstanding accumulation of high cyclic fatigue cycle counts during service life of substrate 110.

As shown in FIG. 5 resistive heating circuit 140 includes an etched mesh body or wire mesh body 142 with a flexibility 143. It is contemplated that flexibility 105 of bus bar 104 be equivalent to or greater than flexibility 143 of etched or wire mesh body 142. As will be appreciated by those of skill in the art in view of the present disclosure, matching (or exceeding) flexibility 143 of etched or wire mesh body 142 with flexibility 105 of bus bar 104 allows communication of electric current 16 (shown in FIG. 1) through resistive heating circuit 140 across structures subject to cyclic flexure and/or high fatigue with robustness, ensuring reliable heating or ice protection of substrate 110 notwithstanding accumulation of high cyclic fatigue cycle counts during service life of substrate 110.

Figure 6:
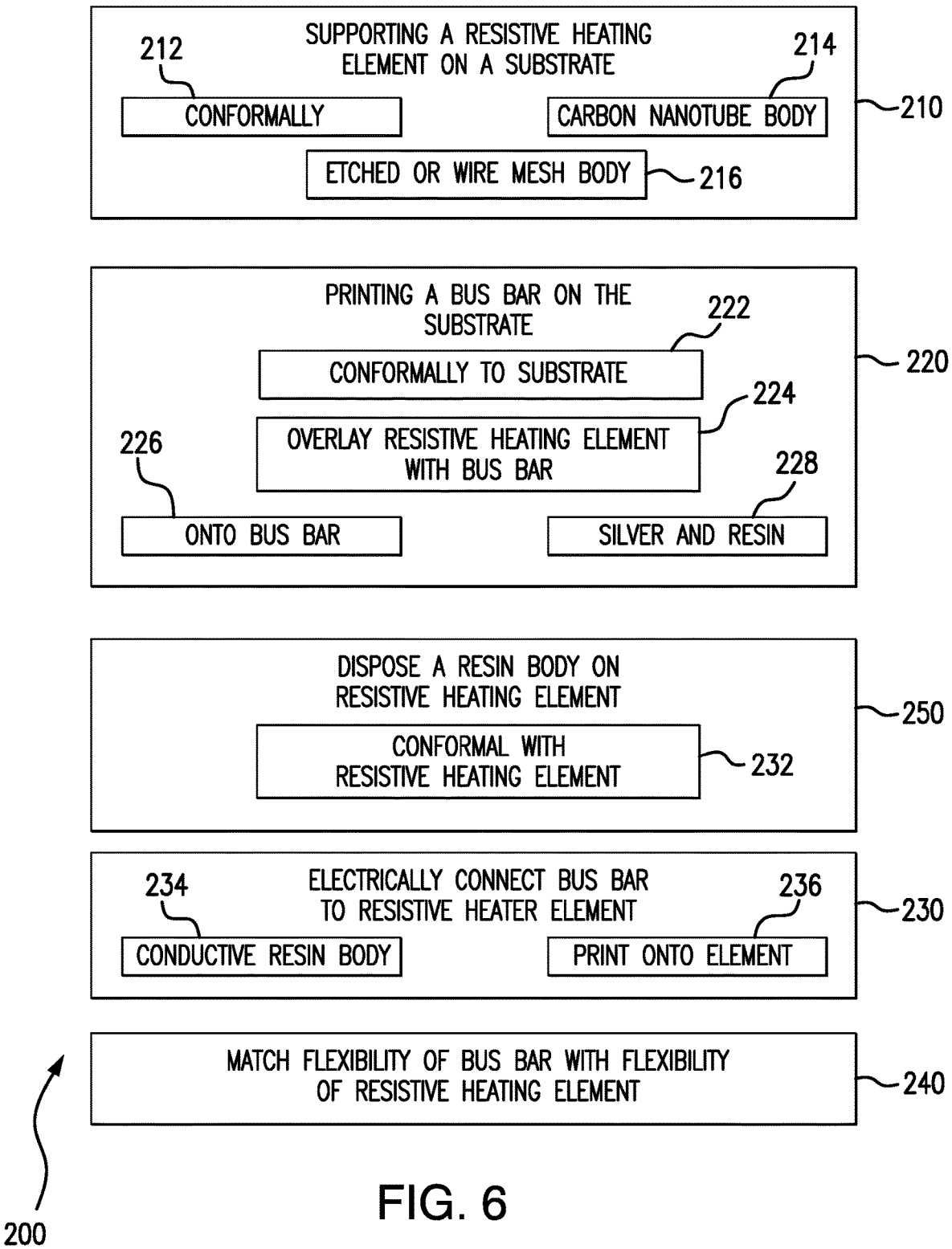
FIG. 6 is a block diagram of a method of making a resistive heating circuit for a heated or ice protected aircraft structure, showing steps of the method.

With reference to FIG. 6, a method 200 of making a resistive heating circuit for a heated or ice protected aircraft structure, e.g., resistive heating circuit 100 (shown in FIG. 1), is shown. As shown with box 210, a resistive heating element, e.g., resistive heating element 102 (shown in FIG. 1) is supported on a flexible dielectric substrate, e.g., substrate 110 (shown in FIG. 1). A bus bar, e.g., bus bar 104 (shown in FIG. 1), is printed on the substrate using a conductive ink, e.g., conductive ink 112 (shown in FIG. 2), as shown with box 220. The bus bar is electrically connected to the resistive heating element, as shown with box 230. Flexibility of the resistance heating element, e.g., flexibility 103 (shown in FIG. 1), matched or exceeded by flexibility of the bus bar, e.g. flexibility 105 (shown in FIG. 1), such that resistive heating circuit flexes freely with the heated or ice protected aircraft structure, as shown with box 240.

Supporting the resistive heating element can include conformally disposing the resistive heating circuit onto the substrate, as shown with box 212. It is contemplated that the resistive heating element can include carbon nanotubes, e.g., carbon nanotube body 114 (shown in FIG. 2), as shown with box 214. It is also contemplated that the resistive heating element can include an etched or wire mesh body, e.g., etched or wire mesh body 130 (shown in FIG. 5), as shown with box 216.

Printing the bus bar can include conformally disposing the bus bar onto the substrate, as shown with box 222. The bus bar can be printed on the substrate such that a portion, e.g., portion 118 (shown in FIG. 2), overlays the resistive heating element, as shown with box 224. It is contemplated that the printing the bus bar on the substrate can include conformally disposing the bus bar onto the resistive heating element, as shown with box 226. It is also contemplated that the bus bar can be printed a conductive ink including silver particles and a resin, e.g., silver particles 122 (shown in FIG. 2) and resin 124 (shown in FIG. 2), as shown with box 228.

As shown with box 250, a conductive resin body, e.g., resin body 132 (shown in FIG. 2), can be disposed on the resistive heating element. Electrically connecting the bus bar to the resistive heating element can include electrically connecting the bus bar to the resistive heating element with the resin body, as shown with box 230. It is contemplated that the conductive resin can be conformally disposed on the resistive heating element, as shown with box 234. It is also contemplated that the overlaying portion of the bus bar can be conformally disposed onto the conductive resin body, as shown with box 236.

The methods and systems of the present disclosure, as described above and shown in the drawings, provide for resistive heating circuits with superior properties including fatigue resistance in the bus bars electrically connecting the resistive heating elements with flexibility matching (or exceeding) flexibility of the resistive heating elements, allowing the bus bar to be placed on structures subject cyclic flexure and high fatigue. While the systems and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A resistive heating circuit for a heated or ice protected aircraft structure, comprising:
a flexible dielectric substrate;
a resistive heating element supported by the substrate; and
a bus bar electrically connected to the resistive heating element, wherein the bus bar includes a conductive ink printed onto the substrate such that the bus bar and resistive heating element flex freely with the heated or ice protected aircraft structure, wherein the resistive heating element is conformally disposed onto the substrate, wherein the bus bar is conformally disposed onto the substrate, wherein a portion of the bus bar overlays the resistive heating element.

2. The resistive heating circuit as recited in claim 1, wherein the bus bar is at least as flexible as the resistive heating element.

3. The resistive heating circuit as recited in claim 1, wherein the resistive heating element includes carbon nanotubes.

4. The resistive heating circuit as recited in claim 1, wherein the resistive heating element includes an etched mesh pattern.

5. The resistive heating circuit as recited in claim 1, wherein the resistive heating element includes a wire mesh pattern.

6. The resistive heating circuit as recited in claim 1, wherein the conductive ink includes silver particles in an epoxy resin.

7. The resistive heating circuit as recited in claim 1, wherein the overlaying portion of the bus bar is conformally disposed onto the resistive heating element.

8. The resistive heating circuit as recited in claim 1, further comprising a conductive resin body electrically connecting the bus bar to the resistive heating element.

9. The resistive heating circuit as recited in claim 8, wherein the conductive resin is conformally disposed on the resistive heating element.

10. The resistive heating circuit as recited in claim 8, wherein the overlaying portion of the bus bar is conformally disposed onto the conductive resin body.

11. A heated or ice protected aircraft structure having a resistive heating circuit as recited in claim 1, the resistive heating circuit supported by heated or ice protected aircraft structure.

12. A method of making a resistive heating circuit for a heated or ice protected aircraft structure, the method comprising:
supporting a resistive heating element with a flexible dielectric substrate;

printing a bus bar on the dielectric substrate using a conductive ink;

electrically connecting the bus bar to the resistive heating element;

matching or exceeding flexibility of the resistance heating element with flexibility of the bus bar such that resistive heating circuit flexes freely with the heated or ice protected aircraft structure, wherein the step of supporting includes conformally disposing the resistive heating element onto the substrate; and conformally disposing the bus bar onto the substrate, wherein conformally disposing the bus bar onto the substrate includes overlaying a portion of the bus bar on the resistive heating element.

13. The method as recited in claim 12, wherein the resistive heating circuit includes carbon nanotubes, wherein the conductive ink includes silver particles in an epoxy resin.

14. The method as recited in claim 12, wherein the step of overlaying includes conformally disposing the bus bar portion onto the resistive heating element.

15. The method as recited in claim 14, further comprising:

disposing a conductive resin body on the resistive heating element; and electrically connecting the bus bar to the resistive heating element with the conductive resin body, wherein, wherein the conductive resin is conformally disposed onto the resistive heating element, and wherein the overlaying portion of the bus bar is conformally disposed onto the conductive resin body.

\* \* \* \* \*